United States Patent
Van Bruggen et al.

(10) Patent No.: US 9,701,419 B2
(45) Date of Patent: Jul. 11, 2017

(54) METHOD FOR DETERMINING A STATE OF A COMPONENT IN A HIGH LIFT SYSTEM OF AN AIRCRAFT

(71) Applicant: Airbus Operations GmbH, Hamburg (DE)

(72) Inventors: Jan-Arend Van Bruggen, Hamburg (DE); Eugen Neb, Hamburg (DE); Michael Brady, Hamburg (DE); Wolfgang Hartwig, Hamburg (DE); Olivier Criou, Hamburg (DE); Stefan Latzel, Hamburg (DE); Mark Heintjes, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/977,125

(22) Filed: Dec. 21, 2015

(65) Prior Publication Data

US 2016/0176539 A1 Jun. 23, 2016

(30) Foreign Application Priority Data

Dec. 22, 2014 (EP) .................................... 14199907

(51) Int. Cl.
*G01M 17/00* (2006.01)
*G06F 7/00* (2006.01)
(Continued)

(52) U.S. Cl.
CPC ............... *B64D 45/00* (2013.01); *B64C 9/16* (2013.01); *B64C 13/28* (2013.01); *B64D 45/0005* (2013.01)

(58) Field of Classification Search
None
See application file for complete search history.

(56) References Cited

U.S. PATENT DOCUMENTS

| 4,904,999 A | 2/1990 | Klansnic et al. |
| 2003/0093187 A1* | 5/2003 | Walker .................... B64C 13/20 701/1 |

(Continued)

FOREIGN PATENT DOCUMENTS

| DE | 102010021576 A1 | 12/2011 |
| DE | 102010025475 A1 | 12/2011 |

OTHER PUBLICATIONS

European Patent Office, European Search Report for European Patent Application No. 14199907.8 mailed Dec. 6, 2015.

*Primary Examiner* — Nicholas Kiswanto
*Assistant Examiner* — Kenny A Taveras
(74) *Attorney, Agent, or Firm* — Lorenz & Kopf, LLP.

(57) ABSTRACT

A method for determining a state of a component in a high lift system of an aircraft comprises the steps of extending at least one high lift surface, which is coupled with two drive struts, wherein at least one of the two drive struts is a load sensing drive strut, to a first extended position, acquiring a first load sensed by a load sensing drive strut associated with the at least one high lift surface at a first flight state having a first speed, comparing the first load with a known nominal load for the first extended position and the first flight state under consideration of a predetermined threshold, and producing an alarm signal in case the acquired load differs from the nominal load including the predetermined threshold.

16 Claims, 2 Drawing Sheets

(51) Int. Cl.
    *B64D 45/00*     (2006.01)
    *B64C 9/16*     (2006.01)
    *B64C 13/28*     (2006.01)

(56) References Cited

U.S. PATENT DOCUMENTS

| | | | |
|---|---|---|---|
| 2007/0080261 A1* | 4/2007 | Neumann | B64D 45/0005 244/194 |
| 2010/0001674 A1* | 1/2010 | Hauzenberger | B64C 13/24 318/434 |
| 2010/0100355 A1* | 4/2010 | Marx | B64D 45/0005 702/183 |
| 2012/0091282 A1* | 4/2012 | Spiller | B64C 9/16 244/213 |
| 2013/0261852 A1* | 10/2013 | Recksiek | B64C 13/24 701/3 |
| 2014/0297102 A1* | 10/2014 | Moy | B64D 45/00 701/33.9 |
| 2015/0360769 A1* | 12/2015 | Dege | B64C 13/28 244/213 |
| 2016/0114881 A1* | 4/2016 | Neb | B64C 9/00 701/3 |
| 2016/0114904 A1* | 4/2016 | Neb | B64C 9/20 701/3 |
| 2016/0176539 A1* | 6/2016 | Van Bruggen | B64D 45/00 701/33.9 |
| 2016/0176540 A1* | 6/2016 | Fleddermann | B64D 45/00 701/33.9 |

* cited by examiner

METHOD FOR DETERMINING A STATE OF A COMPONENT IN A HIGH LIFT SYSTEM OF AN AIRCRAFT

CROSS-REFERENCE TO RELATED APPLICATIONS

This application claims the priority of European Patent Application No. 14 199 907.8, filed on Dec. 22, 2014, the disclosure of which is herewith incorporated herein by reference in its entirety.

TECHNICAL FIELD

This relates to a method for determining a state of a component in a high lift system of an aircraft, a high lift system of an aircraft, and an aircraft having such a high lift system.

BACKGROUND

A high lift system of an aircraft serves the purpose of lift and drag management. A high lift system is often composed of a leading edge slat system and a trailing edge flap system. Many flap systems in civil and military aircraft are equipped with a central drive unit, which is also known as power control unit (PCU), which drives a transmission shaft train and local mechanical actuator devices, the so-called drive stations, on corresponding support stations of the movable surfaces. The high lift settings are selectable by a cockpit crew through a flaps lever, through which a surface angle is selectable.

Such a transmission system provides a load path from the central drive unit to all actuator outputs, leading to a symmetrical deployment of all high lift surfaces. Certain kinematics in the drive stations transform a rotary motion driven by the drive station into a required surface movement.

A high lift flap system is often controlled and monitored by control computers, the so-called flap channel of the slat flap control computers (SFCC). System drive commands primarily originate from an input device, such as a flaps lever input. The surfaces will be driven to predetermined positions (flap or slat settings) that are laid down in the software of the respective control computer. For achieving a high accuracy in driving the high lift surfaces to the predetermined positions, positions are continuously fed back/monitored by feedback position pick-off units (FPPU) attached to the drive unit and fitted with an internal gearbox to dedicate an equivalent system angle.

Further sensors are dedicated to system failure monitoring such as station position pick-off units (SPPU), which are connected to individual drive stations to dedicate an equivalent angle for each station for system monitoring purposes.

Flap or slat attachment monitoring is useful for detecting a potentially abnormal state of a driven flap or slat. Commonly, each flap or slat is driven by two stations and the position of these two stations are monitored by two independent station position pick-off units. The above-mentioned control computer may be provided with a flap or slat skew monitoring for detecting an abnormal surface twist (skew). In case a predetermined skew threshold is exceeded, the control computer may interrupt the operation of the high lift system.

SUMMARY

In case of a disconnect of one of the drive stations, the respective high lift surface is held by the remaining second station. With the aircraft in flight, i.e. under air loads, the disconnect failure leads to an abnormal twist (skew) of the affected surface, wherein the skew is computed by controllers through evaluating the signals delivered by position feedback supplied from the SPPUs and is continuously compared with a fixed skew threshold. In case an abnormal flap skew condition is validated and confirmed, the high lift system is arrested and locked in a safe state until maintenance operations can be conducted. However, the skew monitor must be sensitive enough to detect very slight abnormal twist of a high lift surface. On the other hand, the skew monitor must be robust enough to avoid spurious skew detection in cases where the system is intact, but the air loads are very high. This means that the margin between twist of a system experiencing undesired conditions under minimal air loads and twist of an intact system with maximum air loads may be very small. In order to still be able to robustly distinguish between these two scenarios the requirements for accuracy of the measurement chain are very strong.

It is an object to propose a method for determining the state of a component in a high lift system of an aircraft with a high robustness, which works within one flight cycle under all operational conditions and which does not require extremely accurate sensors in a measurement chain.

A method for determining a state of a component in a high lift system of an aircraft is proposed, the high lift system comprising a central power control unit for providing rotational power by means of a transmission shaft; drive stations coupled with the power control unit; movable high lift surfaces; and a control unit, wherein each high lift surface is coupled with at least two of the drive stations by means of drive struts, wherein at each high lift surface at least one of the associated drive struts is a load sensing drive strut; the method comprising the steps of extending at least one high lift surface to a first extended position, acquiring a first load sensed by a load sensing drive strut associated with the at least one high lift surface at a first flight state having a first speed, comparing the first load with a known nominal load for the first extended position and the first flight state under consideration of a predetermined threshold, and producing an alarm signal in case the acquired load differs from the nominal load including the predetermined threshold.

The method according to an embodiment allows the detection of an undesired condition of a component in the high lift system that may lead to a skewed high lift surface. Other than in common high lift systems, the skew detection is not based on the acquisition of certain positions.

According to core features of the embodiment, each of the high lift surfaces is coupled with at least one load sensing drive strut (LSDS) which is adapted for acquiring a load between a drive system and the mechanical connection of the respective high lift surface. Such an electro-mechanical component may already be present in the aircraft of interest, particularly for determining whether unacceptable high loads between an actuation system and a high lift surface occur. Hence, the method according to the embodiment may be implemented in an aircraft without providing any modifications to mechanical components.

This approach allows the avoidance of extremely accurate skewing determination. For example, in case a station disconnect occurs at a high lift surface during a flight phase with rather slight air loads, a skew monitor must be sensitive enough to detect very slight abnormal twist of the surface. On the other hand, the flap skew monitor must be robust enough to avoid spurious skew detection in cases where the system is intact, but the air loads are very high. This means that the margin between the twist of a system having a failure under minimal air loads and twist of an intact system with maximum air loads may be very small. However, due to changing the measurement principle in replacing position sensing by load sensing, based on the use of a load sensing drive strut, the method according to the embodiment is able to very robustly distinguish between these two scenarios and the requirements for accuracy of the measurement chain are not too strong. Resultantly, this not only leads to a high accuracy in determining a skew condition, but also to a cost-saving implementation.

The main principle of the method lies in determining, whether the respective load sensing drive strut experiences a load, which lies in a narrow range around a nominal load, which is to be expected inter alia at a certain speed of the aircraft and a certain position of the respective high lift surface or whether the load clearly differs from such a range around the nominal load.

Assuming that a high lift surface is coupled with two drive struts, wherein at least one of them is a load sensing drive strut, a disconnection of one of the drive struts may be detected through acquiring and monitoring the load of the load sensing drive strut. In case an acquired first load is clearly below the nominal load, under consideration of the predetermined threshold, the drive strut and the respective drive station connected thereto will most probably be disconnected. Resultantly, the remaining drive strut will carry the total aerodynamic loads acting on the surface. However, in case the acquired second load is clearly above the nominal load, under consideration of the threshold, a neighboring station may be regarded disconnected, such that the load sensing drive strut carries the total aerodynamic loads acting on the surface.

The method according to an embodiment may particularly be useful for dropped hinge kinematics, which may particularly include trailing edge flap systems, but may also include leading edge slat systems.

Advantageously, the method may further comprise acquiring a second load sensed by a load sensing drive strut associated with the at least one high lift surface at a second extended position at a second flight state of the aircraft having a second speed, which is lower than the first flight speed, adjusting the value of the first load through subtracting the value of the second load, before comparing the first load with a known nominal load for the first extended position. Hence, the first load is processed through a correction, compensation or adjustment value, which in turn is a load acquired at another flight state and another speed of the aircraft. Preferably, the second speed is considerably lower than the first speed. Through this correction, any systematic errors in the sensing chain, which may result from the rigging process of the respective high lift surface, may reliably be eliminated.

In another advantageous embodiment, the second extended position is substantially equal to the first extended position. Hence, by choosing another (lower) speed of the aircraft for acquiring the second load any geometry induced effects occurring in the kinematical chain of the drive stations coupled with the high lift surfaces are compensated.

In the second flight state, the aircraft may have touched the ground. When touching the ground, the high lift surfaces usually remain in their extended positions, while the actual speed of the aircraft is considerably lower than during egress. Before the high lift surfaces are retracted again, it is feasible to acquire the second load.

Still further, the second speed may be less than 60 knots. A commercial aircraft usually has already touched the ground at such a speed, enabling the acquisition of a second load with a second speed close to a minimum with extended high lift surfaces.

Resulting in similar benefits, it is advantageous when a set of loads is continuously acquired until a retraction of the high lift surfaces is initiated, wherein the second load is the minimum acquired load of the set of loads. This leads to an approximation of a measurement on ground with the high lift surfaces in the same configuration as during the measurement in the first flight state, which may be during egress of the aircraft. An algorithm used for such a ground load measurement, i.e. the measurement in the second flight state, may start sampling/collecting acquired load values if for example the flight speed, e.g. the computed air speed, drops below 60 knots until the high lift surfaces are commanded to leave the extended position, e.g. the landing configuration. In the collected load values, the algorithm may identify a minimum load, which is set as the second load, which is approximately the ground load.

In an advantageous embodiment, a station disconnect signal is generated when the acquired load is below the nominal load under consideration of the predetermined threshold. As explained above, the drive strut experiences a clearly lower load compared to the nominal load in case the respective drive station, which is connected to the load sensing drive strut, is disconnected.

In an equally advantageous embodiment, a neighboring station disconnect signal is created when the acquired load is above the nominal load including the predetermined threshold.

In this regard, the predetermined threshold may differ in both of the above situations. For example, an "over-load" threshold may be added to the nominal load in case of determining a disconnect of a neighboring station.

The alarm signal mentioned above may include an indication that the drive station, to which the load sensing drive strut is coupled, is disconnected, when the acquired load is below the nominal load under consideration of a first predetermined threshold. This is considered the direct monitoring principle.

In analogy, the alarm signal may include an indication that a neighboring drive station from the drive station, to which the load sensing drive strut is coupled, is disconnected, when the acquired load is above the nominal load under consideration of a second predetermined threshold. In turn, this is considered the indirect monitoring principle.

The method may further comprise a previous step of collecting a set of acquired loads during flight with at least one set of flight parameters with high lift surfaces in at least one extended position and storing the set of acquired loads correlated with the at least one set of flight parameters as known nominal loads. Thereby, the load sensing based method can be conducted.

The embodiment further relates to a high lift system of an aircraft, comprising a central power control unit for providing rotational power; a transmission shaft; drive stations coupled with the power control unit by means of the transmission shaft; movable high lift surfaces; and a control unit, wherein each high lift surface is coupled with at least two of the drive stations by means of drive struts, wherein at each high lift surface at least one of the associated drive struts is a load sensing drive strut, wherein the control unit is adapted for acquiring a first load sensed by a load sensing drive strut associated with the at least one high lift surface at a first flight state having a first speed at a first extended position, comparing the first load with a known nominal load for the first extended position and the first flight state under consideration of a predetermined threshold, and producing an alarm signal in case the acquired load differs from the nominal load including the predetermined threshold.

The control unit may further comprise a memory, wherein the control unit is adapted for storing known nominal loads associated with a plurality of flight states in the memory.

Also, the control unit may be adapted for retrieving known nominal loads.

In this regard, it is stated that the control unit may be a part of or be implemented in the SFCC through a software based integration.

Still further, the embodiment relates to an aircraft having a wing comprising at least one such high lift system.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1A:
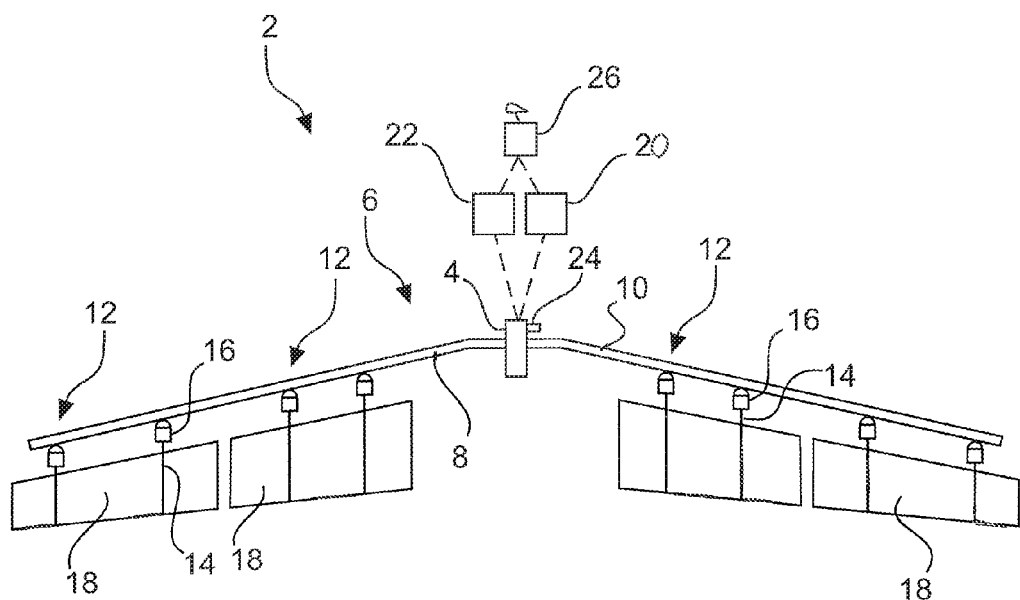
FIG. 1A shows a schematic, block-oriented view of a high lift system, which is able to conduct the method according to the embodiment.

In FIG. 1, a general setup of a high lift system 2 is shown. Here, a power control unit 4 is coupled with a transmission shaft system 6 comprising a left transmission shaft 8 and a right transmission shaft 10. These are coupled with drive stations 12 distributed along the transmission shafts 8 and 10 exemplarily along a trailing edge section of a wing, which is not depicted in FIG. 1.

Each drive station 12 exemplarily comprises a drive strut 14 as well as an actuator 16, which is driven by the respective transmission shaft 8 and 10, respectively. Each of a plurality of high lift surfaces, which are shown as flaps 18, is exemplarily coupled with two drive stations 12. Both drive stations 12 are arranged at a distance to each other, exemplarily at two opposite lateral flap ends. Usually, two redundant flap control computers 20 and 22, which both may also be referred to as a control unit in the light of the embodiment, which flap control computers 20 and 22 are coupled with the PCU 4.

Furthermore, a feedback position pick-off unit 24 is coupled to the flap control computers 20 and 22 and allows the determination of an actual rotational position of the transmission shaft system 6, leading to the ability to determine the position of the high lift surfaces 18, which depends on the rotational position of the transmission shaft system 6. A flaps lever 26 provides an input into the flap control computers 20 and 22, which then drive the power control unit 4 such that the actually determined rotational position of the transmission shaft system 6 equals the commanded angle.

Figure 1B:
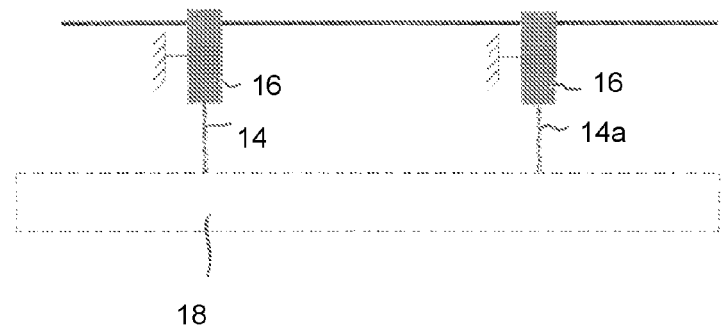
FIG. 1B shows an enlarged section of FIG. 1A with a high lift surface and drive struts coupled thereto.

FIG. 1B shows a high lift surface 18 coupled with two drive struts 14, 14a, wherein drive strut 14a is a load sensing drive strut capable of sensing a load. The high lift surface 18 may particularly be movable through a dropped-hinge kinematic.

Figure 2A:
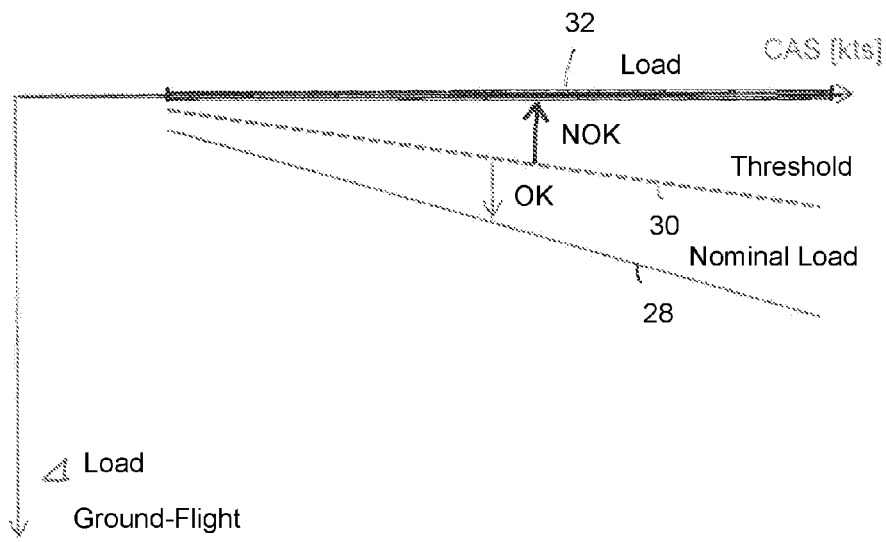
FIG. 2A shows load curves for direct and indirect monitoring of a drive station disconnect.

FIG. 2A shows a nominal load value 28 depending on the air speed of the aircraft. The nominal load 28 is a load, which is to be expected during a normal operation of the aircraft in a certain extension position of the high lift surfaces. However, the nominal load 28 is more or less a theoretically expectable value, which should be basis for a comparison only under consideration of a certain threshold 30.

For example, a load value 32 that occurs during flight and which is to be measured under usage of the load sensing drive strut 14a, may differ. In case the acquired load 32 falls below a nominal load 28 further than a predetermined threshold 30, it is to be expected that the drive station 12 associated with the load sensing drive strut 14a is disconnected. The acquired load 32 is in an area labeled with "NOK", i.e. "not ok", while the acceptable area is labeled with "OK".

Figure 2B:
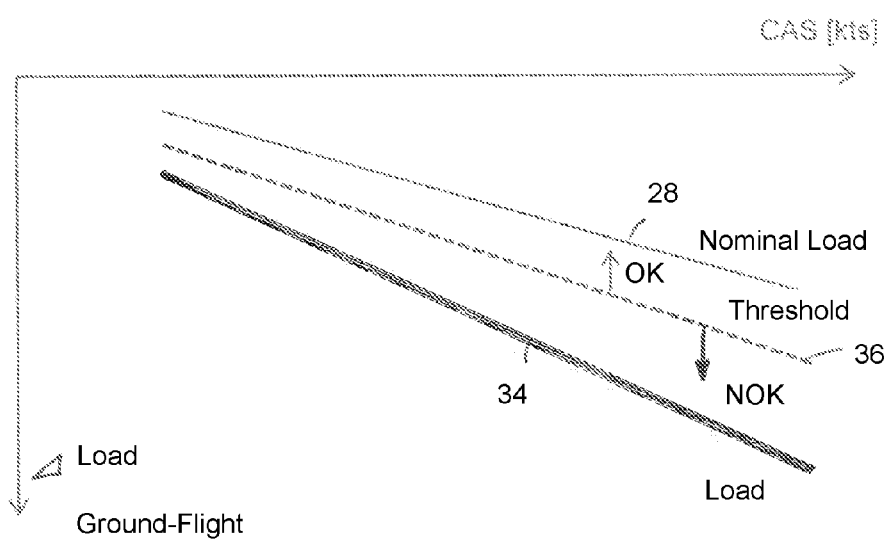
FIG. 2B shows load curves for direct and indirect monitoring of a drive station disconnect.

On the other hand, as depicted in FIG. 2B, a disconnect of a neighboring drive station 12, which is not coupled with the load sensing drive strut 14a, may be determined when an acquired load is clearly above the nominal load 28 further than a predetermined threshold 36. Hence, in case the respective neighboring drive station 12 gets disconnected, the load on the load sensing drive strut 14a is clearly increased. The acquired load 34 is in an area labeled with "NOK", i.e. "not ok", while the acceptable area is labeled with "OK".

It should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for determining a state of a component in a high lift system of an aircraft, the high lift system comprising a central power control unit for providing rotational power by means of a transmission shaft; drive stations coupled with the power control unit; movable high lift surfaces; and a control unit, wherein each high lift surface is coupled with at least two of the drive stations by means of drive struts, wherein at each high lift surface at least one of the associated drive struts is a load sensing drive strut; the method comprising the steps of:

extending at least one high lift surface to a first extended position, acquiring a first load sensed by a load sensing drive strut associated with the at least one high lift surface at a first flight state having a first speed, comparing the first load with a known nominal load for the first extended position and the first flight state under consideration of a predetermined threshold, and producing an alarm signal of the acquired load differs from the nominal load including the predetermined threshold.

2. The method of claim 1, further comprising acquiring a second load sensed by a load sensing drive strut associated with the at least one high lift surface at a second extended position at a second flight state of the aircraft having a second speed, which is lower than the first flight speed, and adjusting the value of the first load through subtracting the value of the second load, before comparing the first load with a known nominal load for the first extended position.

3. The method of claim 2, wherein the second extended position is substantially equal to the first extended position.

4. The method of claim 2, wherein in the second flight state the aircraft has touched the ground.

5. The method of claim 2, wherein the second speed is less than 60 knots.

6. The method of claim 5, wherein a set of loads is continuously acquired until a retraction of the high lift surfaces is initiated, wherein the second load is the minimum acquired load of the set of loads.

7. The method of claim 1, wherein the alarm signal includes an indication that the drive station, to which the load sensing drive strut is coupled, is disconnected, when the acquired load is below the nominal load under consideration of a first predetermined threshold.

8. The method of claim 1, wherein the alarm signal includes an indication that a neighboring drive station from the drive station, to which the load sensing drive strut is coupled, is disconnected, when the acquired load is above the nominal load under consideration of a second predetermined threshold.

9. The method of claim 1, further comprising a previous step of collecting a set of acquired loads during flight with at least one set of flight parameters with high lift surfaces in at least one extended position and storing the set of acquired loads correlated with the at least one set of flight parameters as known nominal loads.

10. A high lift system of an aircraft, comprising:
a central power control unit for providing rotational power;
a transmission shaft;
drive stations coupled with the power control unit by means of the transmission shaft;
movable high lift surfaces; and
a control unit,
wherein each high lift surface is coupled with at least two of the drive stations by means of drive struts,
wherein at each high lift surface at least one of the associated drive struts is a load sensing drive strut,
wherein the control unit is adapted for acquiring a first load sensed by a load sensing drive strut associated with the at least one high lift surface at a first flight state having a first speed at a first extended position, comparing the first load with a known nominal load for the first extended position and the first flight state under consideration of a predetermined threshold, and producing an alarm signal in case the acquired load differs from the nominal load including the predetermined threshold.

11. The high lift system of claim 10,
the control unit further comprising a memory,
wherein the control unit is adapted for storing known nominal loads associated with a plurality of flight states in the memory.

12. The high lift system of claim 10,
wherein the control unit is adapted for retrieving known nominal loads.

13. An aircraft, comprising a wing and a high lift system of claim 10.

14. A method for determining a state of a component in a high lift system of an aircraft, the high lift system comprising a central power control unit for providing rotational power by means of a transmission shaft; drive stations coupled with the power control unit; movable high lift surfaces; and a control unit, wherein each high lift surface is coupled with at least two of the drive stations by means of drive struts, wherein at each high lift surface at least one of the associated drive struts is a load sensing drive strut; the method comprising the steps of:

extending at least one high lift surface to a first extended position, acquiring a first load sensed by a load sensing drive strut associated with the at least one high lift surface at a first flight state having a first speed, comparing the first load with a known nominal load for the first extended position and the first flight state under consideration of a predetermined threshold, and producing an alarm signal of the acquired load differs from the nominal load including the predetermined threshold, acquiring a second load sensed by a load sensing drive strut associated with the at least one high lift surface at a second extended position at a second flight state of the aircraft having a second speed, which is lower than the first flight speed, adjusting the value of the first load through subtracting the value of the second load, before comparing the first load with a known nominal load for the first extended position, wherein the second extended position is substantially equal to the first extended position.

15. The method of claim 14, wherein in the second flight state the aircraft has touched the ground, and
the second speed is less than 60 knots.

16. The method of claim 15,
wherein a set of loads is continuously acquired until a retraction of the high lift surfaces is initiated, wherein the second load is the minimum acquired load of the set of loads, and
wherein the alarm signal includes an indication that the drive station, to which the load sensing drive strut is coupled, is disconnected, when the acquired load is below the nominal load under consideration of a first predetermined threshold.

* * * * *